Patented Apr. 14, 1936

2,037,599

UNITED STATES PATENT OFFICE 2,037,599

PROCESS FOR REACTING RUBBER WITH HALOGEN AND OXYGEN GASES

Otto Schweitzer, Frankfort-on-the-Main, Germany, assignor to Metallgesellschaft Aktiengesellschaft, Frankfort-on-the-Main, Germany, a corporation of Germany No Drawing. Application November 29, 1933, Serial No. 700,358. In Germany December 2, 1932

3 Claims. (Cl. 260—1)

The present invention relates to a process for the production of substances formed by the action of halogens and oxygen—or gases (such as air) containing oxygen—or other oxidizing agents, upon rubber or like substances.

It is known that the viscosity of the products obtained by halogenizing rubber by the usual processes depends on the rolling treatment that has been applied to the rubber prior to being halogenized. The more powerful this rolling treatment, the lower the viscosity of the solutions of the halogenized products. If rubber that has not been rolled is employed in the usual halogenizing processes, the resulting products furnish solutions which, in all the degrees of concentration that come under consideration in practice, exhibit the consistency of paste. For this reason, it has always been the practice, hitherto, to employ rubber that has been rolled, in most instances very powerfully. Nevertheless, the viscosity of solutions of the halogenation products obtained from even energetically rolled rubber, is always still very considerable and higher than is desirable for many purposes. On this account, the mastication of the rubber has been carried so far that the "nerve" of the material is completely destroyed, the solution of this absolutely dead-rolled, and perfectly soft or semi-fluid rubber being then treated with ozone, to effect its further depolymerization, prior to the admission of the chlorine. Owing, however, to the extensive depolymerization of the rubber, the resulting products leave much to be desired. Moreover, in all the existing processes, the extensive rolling operations are a source of very considerable expense.

The present invention provides a process by which it is possible, without dead-rolling the rubber—and, as a rule, with only very slight mastication, if any—to produce solutions of halogenation products, which will exhibit, as may be desired, the same or lower—in some cases very much lower—viscosity as (or than) the solutions of the products hitherto obtained, even when these latter were prepared from dead-rolled rubber.

The process of the present invention consists in immersing rubber, rolled or otherwise, in a solvent such as carbon tetrachloride, chlorbenzene, benzene and the like, and subjecting it to the action of oxygen, gases (air) containing same, or other oxidizing agents, and to the action of halogens such as chlorine. The rubber is however preferably employed in a dissolved condition. The oxidation treatment may precede the halogenation, but is preferably applied concurrently therewith. In some cases, for example in the production of lightly halogenized products, it is advisable to apply or continue the oxidation treatment after the halogenation.

In order to obtain, for example, chlorination products, the preferred procedure is to introduce a current of chlorine, concurrently with a preferably much weaker current of oxygen, or air, or a mixture of the two, into the rubber solution.

If it be desired to dispense entirely with rolling the rubber, the raw rubber can be introduced, in lumps, into the solvent, the two gases, or the gaseous mixture being then admitted. The gases may also be admitted alternately, the periods of admission of the several gases being controlled in accordance with the progress of the reaction or the viscosity of the solution. When a gaseous mixture is employed, the relative proportions of the gases therein may be varied during the working operation, for the same reasons as set forth above. The reaction may be carried out under ordinary or elevated pressure; and with a view to accelerating the reaction, it is preferable to operate at an elevated temperature. The reaction under pressure may be carried on in closed apparatus and also in a gas current. In operating under pressure, the chlorine may also be supplied in liquid form. Bromine, if employed, may also be supplied in liquid form, but the process may be carried out by mixing a certain amount of bromine vapour with a current of gas (air) containing oxygen, and then introducing this gaseous mixture into the solvent containing the rubber in solution or in the solid state.

The same treatment as for rubber may also be applied to similar hydrocarbons, such as guttapercha, balata and artificial rubber substitutes such as polymeric isoprene-butadiene hydrocarbons, and any halogen—that is to say, iodine and fluorine, as well as chlorine and bromine—can be employed for the process of the present invention.

Oxidizing agents adapted to replace oxygen, comprise, for example, ozone, chlorine dioxide, oxides of nitrogen, higher oxides such as $MnO_2$ and $PbO_2$, and also peroxides, per-acids and the like.

*Example I*

Chlorine and air, in the proportion of about 10:1, are passed concurrently into a 5% solution—heated to 60° C.—of rolled "smoked sheet" in carbon tetrachloride. The originally highly viscous solution becomes visibly thinner. The admission of the chlorine and air is stopped when the chlorine content of the product contained in the solution has attained 66%.

The final viscosity of the solution can be varied within wide limits by modifying the amount of air admitted.

Example II

Finely shredded crêpe rubber is suspended in monochlorbenzene, heated to 110° C., the amount of rubber representing 15% of the quantity of solvent taken. A mixture (approximately 12:1) of chlorine and oxygen is then introduced, the crêpe passing rapidly into solution. The reaction mass is kept in constant movement by means of stirrers. The viscosity decreases in proportion as the reaction is prolonged. The mixture of chlorine and oxygen is admitted until the chlorine content of the product contained in the solution has attained 55%. Highly concentrated solutions of low viscosity can be prepared from the dry material recovered from the solutions obtained by the above treatment.

Example III

Air and chlorine are admitted alternately into a 5%, highly viscous solution (at 50° C.) of rolled crêpe in carbon tetrachloride (rate of outflow of the 5% solution in the Ostwald viscosimeter: 1 hour, as compared with 5 seconds in the case of water). The supply of chlorine is stopped when the chlorine content of the product contained in the solution attains 50%. The admission of air is discontinued when the tetrachloride-solution gives the viscosimeter reading of 1 minute.

Example IV

Chlorine gas is passed into a solution of rolled crêpe in monochlorbenzene (at 120°) until the chlorine content of the product contained in the solution has attained 40%. The chlorine supply is then shut off and oxygen is introduced until the viscosity has fallen to 20 seconds (Ostwald viscosimeter reading).

I claim:—

1. In the process for the manufacture of a halogen derivative of rubber by treating the latter, in a rubber solvent, with a halogen, the improvement which consists in initiating the halogenation, supplying to the rubber at least partially halogenated a gas having an oxidizing effect on the rubber by delivery of oxygen, and continuing the addition of oxidizing gas after the halogenation treatment has been discontinued and until a predetermined viscosity of solution has been attained.

2. The improved process as defined in claim 1, characterized in that the halogen treatment is continued until the halogen content of the product is at least 40% based on the weight of the rubber, and in that the oxidizing gas treatment is continued until the viscosity of the solution has fallen to about 20 seconds Ostwald.

3. In the process for the manufacture of a halogen derivative of rubber by treating the latter, in a rubber solvent, with a halogen, the improvement which consists in materially lowering the viscosity of the chlorinated rubber by simultaneously introducing into the solution, while halogenating, an oxidizing gas in quantity equivalent to a ratio of 1 to about 12 of oxygen based upon the amount of chlorine being introduced.

OTTO SCHWEITZER.